(12) United States Patent
Geldmacher

(10) Patent No.: US 7,705,258 B2
(45) Date of Patent: Apr. 27, 2010

(54) ELECTRONIC KEY

(75) Inventor: Alexander Geldmacher, Wuppertal (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 394 days.

(21) Appl. No.: 11/885,312

(22) PCT Filed: Feb. 24, 2006

(86) PCT No.: PCT/EP2006/001745

§ 371 (c)(1), (2), (4) Date: Aug. 29, 2007

(87) PCT Pub. No.: WO2006/092250

PCT Pub. Date: Sep. 8, 2006

(65) Prior Publication Data

US 2009/0173613 A1    Jul. 9, 2009

(30) Foreign Application Priority Data

Mar. 2, 2005 (DE) .................. 10 2005 009 405
Mar. 31, 2005 (DE) .................. 10 2005 014 563

(51) Int. Cl.
*H01H 13/00* (2006.01)
(52) U.S. Cl. ............. 200/341; 200/302.1; 200/296
(58) Field of Classification Search .......... 200/293, 200/296, 341, 511, 517, 302.1–302.3
See application file for complete search history.

(56) References Cited

U.S. PATENT DOCUMENTS

| 5,777,281 | A | * | 7/1998 | Riddiford | 200/5 A |
| 5,803,238 | A | * | 9/1998 | Roza | 200/332.1 |
| 6,355,890 | B1 | * | 3/2002 | Kuroda | 200/5 A |
| 6,635,838 | B1 | * | 10/2003 | Kornelson | 200/341 |
| 6,888,079 | B2 | * | 5/2005 | Altmann | 200/61.54 |
| 6,963,039 | B1 | * | 11/2005 | Weng et al. | 200/302.1 |
| 7,034,238 | B2 | * | 4/2006 | Uleski et al. | 200/500 |

(Continued)

FOREIGN PATENT DOCUMENTS

| DE | 199 64 166 | 8/2001 |
| EP | 1 465 118 | 10/2004 |

*Primary Examiner*—Michael A Friedhofer
(74) *Attorney, Agent, or Firm*—Friedrich Kueffner

(57) ABSTRACT

The aim of the invention is to provide a simple and economical embodiment of an electronic key comprising dimensionally stable push buttons (31). To this end, a membrane (21) and a frame (22) are used is a 2K element (20) of a dual-component technology. The soft component of the 2K element (20) consists of a membrane (21), while the hard component is a frame (22) containing a free membrane field between the frame sections thereof. The housing (11) of the key has an opening (13) which is large enough to fit the entire push button actuation surface (34). The push buttons (31) are freely inserted from the inner side (16) of the housing (11) into the housing opening (13). The 2K element (20) thus secures the push button position in the housing (11). The push buttons (31) are limited at the top and at the bottom. The frame of the 2K element (20) provides the inner abutment (28) for the push buttons (31). The inner surface of each edge region (17) of the housing (11), closing the housing opening (13), functions as an outer abutment (18) for the push button (31).

20 Claims, 3 Drawing Sheets

U.S. PATENT DOCUMENTS

| | | | |
|---|---|---|---|
| 7,041,924 B2 * | 5/2006 | Jeschke et al. | 200/302.2 |
| 7,050,292 B2 * | 5/2006 | Shimura et al. | 361/679.01 |
| 7,157,655 B1 * | 1/2007 | Murzanski | 200/302.2 |
| 7,166,812 B2 * | 1/2007 | White et al. | 200/341 |
| 7,282,657 B2 * | 10/2007 | Wimmer et al. | 200/302.2 |
| 7,288,735 B2 * | 10/2007 | Naijo | 200/512 |
| 2002/0125112 A1 | 9/2002 | Takezawa | |

* cited by examiner

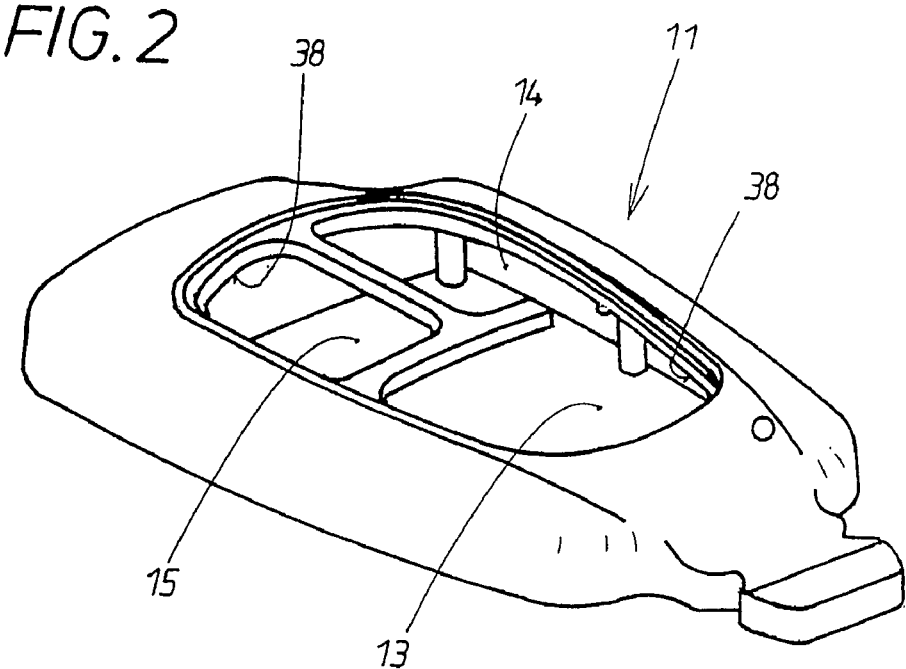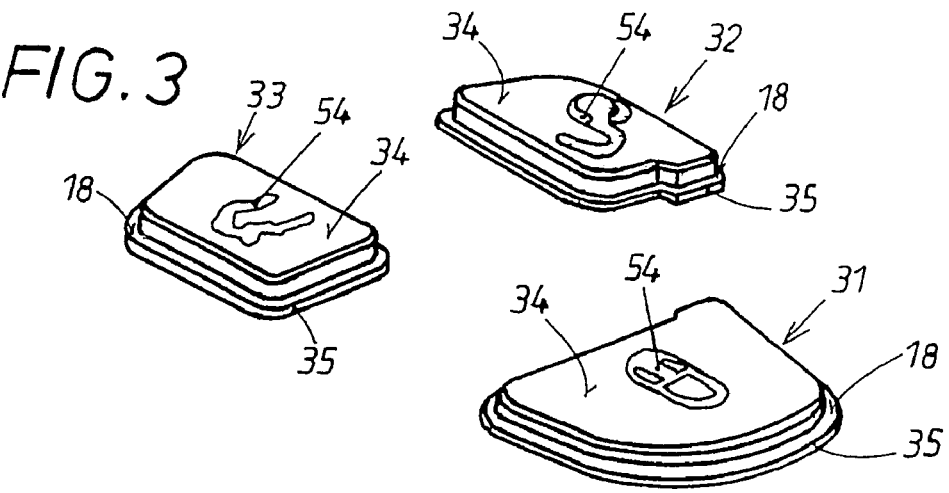

ELECTRONIC KEY

The invention concerns an electronic key, which, as an identification transmitter, sends coded signals to a receiving unit in a motor vehicle and/or receives coded signals from the receiving unit.

DE 199 64 166 C1 discloses an electronic key of the type specified in the introductory clause of Claim 1. The push buttons of the electronic key have a T-shaped cross-sectional profile, in which the stem of the T extends into the inside of the housing through holes in the housing and strikes the actuator of a microswitch when the crosspiece of the T, which is located on the outside of the housing, is actuated. The crosspiece of the T is provided with a recessed peripheral projection, which during the assembly of the push buttons, grips beneath a retaining ring that is to be mounted as a separate part on the outside of the housing. The peripheral projection, which comes to rest on the retaining ring acts as an upper stop in the neutral position of the push buttons. The crosspiece of each T-shaped push button is spring-loaded by a spring element, which is supported on the surface of the housing. In addition, the inside of the housing has a sealing membrane, which extends between the actuators of the individual microswitches, on the one hand, and the end faces of the crosspieces of the T-shaped push buttons, on the other hand. There is also a lower stop for the actuating position of the push-button switch when the crosspieces of the T or the peripheral projections seated thereon strike the surface of the housing. This electronic key consists of a relatively large number of components, which makes it expensive to manufacture and complicated to assemble.

In electronic keys of a different type, which do not have independent, dimensionally stable push buttons, so-called dual-component technology (2K technology) has also already been used. In this case, a membrane that serves as the soft component and the key housing that serves as the hard component are manufactured as a single unit to obtain a so-called 2K element, which consists of a housing-membrane unit. In one application, a push button shaped like a small plate is also immediately formed on this membrane-housing unit as a hard component in one or more openings provided in the housing. For production-related reasons, in this design, large gaps developed between the push buttons shaped like small plates that were formed on the membrane-housing unit, on the one hand, and the housing, on the other hand, in which gaps the membrane located beneath it formed a U-shaped rolled bellows. This large gap is a dirt trap and detracts from the appearance of the electronic key.

In another design, it was possible to avoid this large gap in the housing-membrane unit by fastening the push buttons in the housing openings only afterwards by means of adhesive on the zones of the membrane exposed in the area of the opening. These push buttons could then be designed independently of the hard component of the housing and could be, for example, metallic in nature. The keys of the last two designs have the disadvantage that the push buttons have no travel limitation. This adversely affects the nondeformability and the feel of the push buttons of these previously known keys.

The objective of the invention is to develop a reliable electronic key of the type specified in the introductory clause of Claim 1, which consists of fewer components to be assembled. Furthermore, the push buttons should have a stop in both their neutral position and their actuated position. In accordance with the invention, this is achieved by the features specified in Claim 1, which have the following special significance.

In the invention, a 2K injection molding technique is used to form a membrane from a soft component and a frame from a hard component on the membrane. This intermediate product will be referred to below simply as a "2K element". In this 2K element, the frame, on the one hand, encloses an open membrane field and, on the other hand, produces an inner stop for the push button or push buttons. In this connection, the housing opening is designed sufficiently large that the entire push button actuation surface can be freely inserted into the opening from inside the housing. The position of the push buttons in these large housing openings is thus secured by the aforementioned 2K element, which in its assembled state rests with its frame on an inside surface of the housing. A section of the inner surface in the peripheral zone of the housing that surrounds the housing openings simultaneously serves as the outer stop for the push button. This peripheral zone inner surface thus forms the upper stop for the neutral position of the push buttons in the key of the invention.

Additional measures and advantages of the invention are described in the dependent claims and the following description and are illustrated in the drawings, which show a specific embodiment of the invention.

FIG. 1 shows a portion of the electronic key of the invention in a greatly enlarged longitudinal section.

The most important components of the invention are shown in FIGS. 2 to 8.

FIG. 2 is a perspective view of an upper part of the housing of the key shown in FIG. 1.

FIGS. 3 to 5 are perspective views of three push buttons, which are to be inserted from the inside of the housing into the openings in the upper part of the housing shown in FIG. 2.

Figure 7:
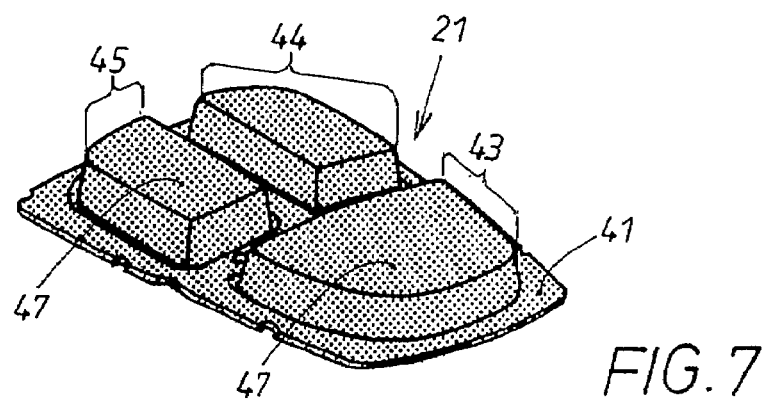

The two components of this 2K element are successively produced in the same mold and thus do not exist as individual parts. These components are shown in FIGS. 7 and 8, specifically:

FIG. 7 shows the soft component of the 2K element, which has an elastic membrane with a pot-shaped profile in some places.

Figure 8:
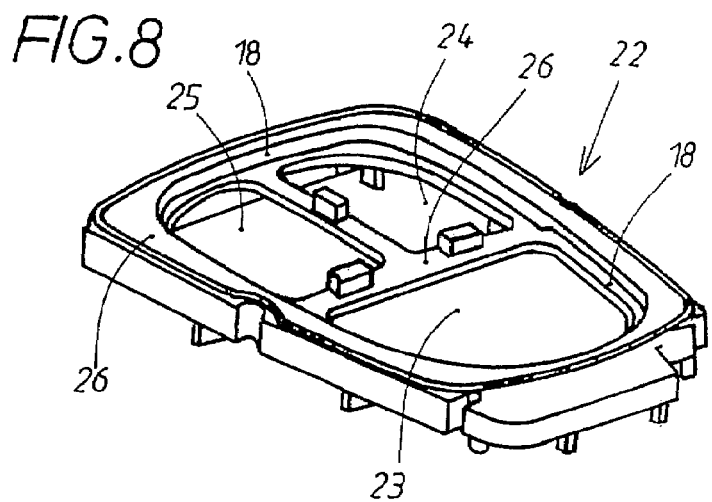

FIG. 8 shows the hard component of the 2K element in the form of a frame with various internal and peripheral webs.

Figure 1:
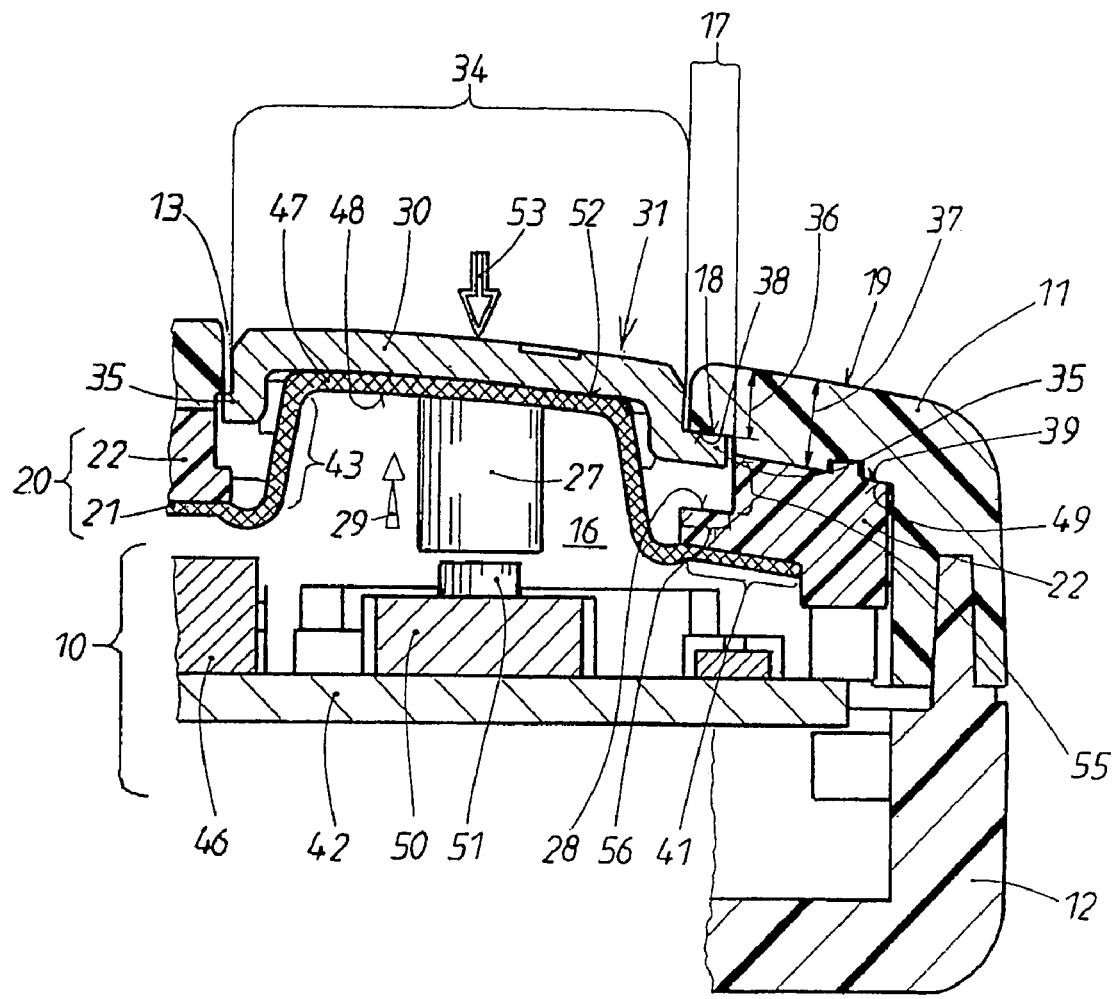
Figure 6:
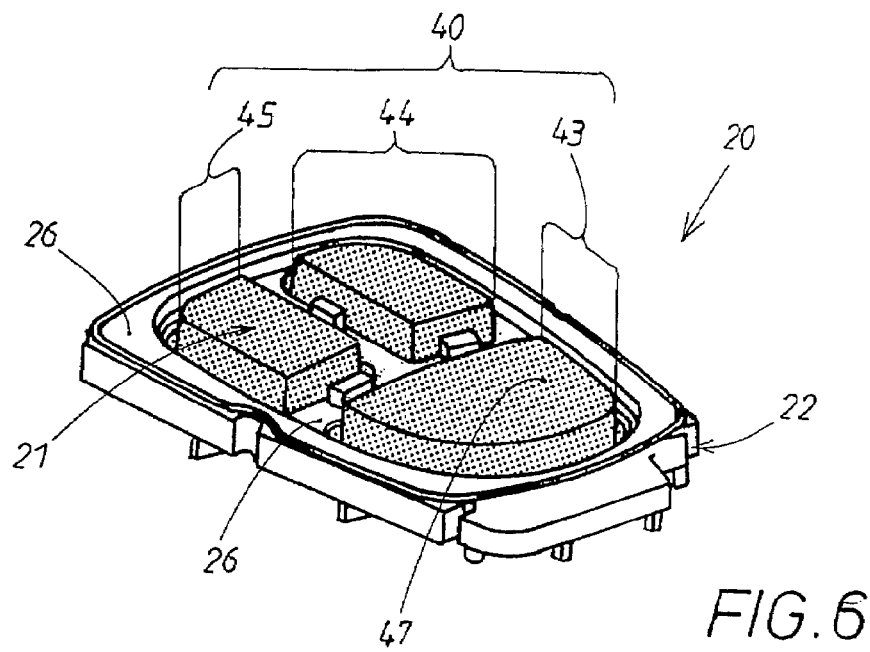
FIG. 6 is a perspective view of a 2K element, which was produced by so-called dual-component technology and cooperates with the components of FIGS. 2 to 5.

Besides the electronic components 10 indicated schematically in FIG. 1, only three components need to be produced and mounted on one another in the key, namely, a two-part housing 11, 12, several push buttons 31 to 33, and the aforementioned 2K element 20 according to FIG. 6. The upper part 11 of the housing shown in FIG. 2 has three openings 13 to 15, into which one of three push buttons 31 to 33 can be inserted from the interior 16 of the housing. The push buttons 31 to 33 either consist of metallic material 30 or have a metallic coating on a plastic core. The basic design and operation of the push buttons 31 to 33 will be explained in greater detail with reference to push button 31 in FIG. 1.

The push button 31 has a push button actuation surface 34, which, during normal use of the key, is manually pressed in the actuation direction indicated by actuation arrow 53 into the interior 16 of the housing against a spring force, as illustrated by a force arrow 29 in FIG. 1. The housing opening 13 is constructed sufficiently large that the whole push button actuation surface 34 is enclosed. The opening 13 is surrounded by a peripheral zone 17 of the upper part 11 of the housing, and the inner surface 18 of the peripheral zone 17 serves as an outer stop for the push button 31 in its neutral position, which is shown in FIG. 1. Specifically, a recessed peripheral projection 38 comes to rest on this outer stop 18 in the neutral position. As is shown especially clearly in FIGS. 3 to 5, the peripheral projection 38 consists of a flange 35, which is located in the peripheral region of the individual push buttons 31 to 33 and can be provided with interruptions. In particular, it is recommended that this region be designed as follows.

The thickness 36 of the housing inner surface 18 of the peripheral zone 17 of the opening is smaller than the thickness 37 of the adjacent regions of the housing. This results in an opposing step that is set higher on the inner surface 18 of the peripheral zone 17 of the housing around the opening 13 relative to the adjacent inner surface 39 of the upper part 11 of the housing. In this regard, the peripheral projection produced by the flange 35 is set back sufficiently far relative to the push button actuation surface 34 that in the neutral position illustrated in FIG. 1, the active spring force 29 positions the push button 31 essentially flush with the outer surface 19 of the upper part 11 of the housing.

The aforementioned 2K element 20 consists of an elastic soft component, which is accentuated by shading in FIGS. 6 and 7 and produces a continuous membrane in the housing interior 16 of the key when it is later installed. The 2K element 20 additionally comprises a hard component 22, which is produced as a single part with the membrane 21 by the aforementioned 2K technology. The hard component 22 consists of relatively hard plastic and is constructed as a frame with peripheral and internal webs 26. Three holes 23 to 25 are formed between these webs 26 and have the following special significance.

The profiled membrane 21 is provided with three pot-shaped bulges 43 to 45, which are formed upward from a flat membrane surface 41 that surrounds them. The required connection between the membrane 21 and the frame 22 during the production of the 2K element 20 as a single piece is effected by means of the flat membrane surface 41. The three pot-shaped membrane bulges 43 to 45 pass through the three aforementioned holes 23 to 25 in the frame 22. An open membrane field 40 is formed in the 2K element between the frame webs 26 and consists of the three membrane bulges 43 to 45.

As has already been mentioned, the electronic components 10 in the housing interior 16 are arranged in well-defined positions between the two housing parts 11, 12 on a printed circuit board 42. The electronic components 10 include a microswitch 50, which is mounted on the printed circuit board 46 and has an actuator 51 for its switch contacts. It goes without saying that, instead of a microswitch 50, any other well-known type of switching element could also be used. Various electrical elements 46 mounted on the printed circuit board 42 are activated or inactivated by the microswitch 50. Monodirectional or bidirectional communication then occurs between the electronic key and corresponding transmitters and receivers in the vehicle in order to carry out certain functions in the vehicle. Suitable directions, e.g., in the form of symbols 54, are applied on the visible push button actuation surface 34 of the push buttons 31 to 33. These directions make known the operation produced in the motor vehicle by actuation 53. Details of the assembly of the components described above will now be described.

After the three push buttons 31 to 33 have been inserted in their housing openings 13 to 15, they are secured in their positions by the 2K element 20. The upper edge 49 of the frame of the 2K element 20 comes to rest against the aforementioned adjacent inner surface 39 of the upper part 11 of the housing. Any desired method can be used to join the 2K element 20 and the upper part 11 of the housing. Suitable joints can be produced by adhesive bonding, friction welding, clips, lasers, and/or ultrasound. Suitable projections and recesses between the contact surfaces 39, 49 provide for exact seating of the frame 20. In this regard, the outer surface 47 of the base of each pot-shaped membrane bulge 43 to 45 comes to rest against the underside 52 of the corresponding push button 31 to 33.

As FIG. 1 further shows, a striker 27 is formed on the inner surface 48 of the base 47 of the pot-shaped bulge. When the device has been assembled, as shown in FIG. 1, the end face of this striker 27 is aligned with the actuator 51 of the microswitch 50. If the push button 31 is pushed in the direction of actuation arrow 53 in FIG. 1, the soft component in the region of the exposed membrane field 40 produces at least a portion of the aforementioned spring force 29 for returning the push button to its initial position. Specifically, during actuation 53, the corresponding membrane bulge 43 is deformed.

The aforesaid spring force 29 for restoring the push button 31 can also be produced completely or partially by the inherent restoring force underlying the actuator 51 of the microswitch 50. With the membrane 21 of the 2K element interposed, this restoring force of the switch actuator 51 can contribute to the spring force 29 of the corresponding push button 31 to 33.

When the respective push button 31 is actuated 53, an inner stop 28 is active, which limits the lower travel of the push button 31. This inner stop 28 is produced by the frame 22 of the 2K element 20. As can be seen in FIG. 1, this inner stop 28 is formed by a step 55 in that region 56 of the aforesaid frame webs 26 which faces the membrane bulges 43 to 45 in the exposed membrane field 40. The inner stop 28 is lowered relative to the aforementioned upper edge 49 of the frame.

LIST OF REFERENCE NUMBERS 10 electronic components (FIG. 1)
11 housing, upper part
12 housing, lower part
13 first housing opening for 31 in 11 (FIG. 2)
14 second housing opening for 32 in 11 (FIG. 2)
15 third housing opening for 33 in 11 (FIG. 2)
16 housing interior, housing inner surface
17 peripheral zone of opening 13 (FIG. 1)
18 outer stop, inner surface of 17
19 outer surface of 11
20 2K element
21 soft component of 20, membrane
22 hard component of 20, frame
23 first hole in 22 (FIG. 8)
24 second hole in 22 (FIG. 8)
25 third hole in 22 (FIG. 8)
26 frame web of 22 (FIGS. 6, 8)
27 striker in 48 of 47 (FIG. 1)
28 inner stop for 31
29 arrow of the spring force (FIG. 1)
30 metallic material of 31 (FIG. 1)
31 first push button (FIGS. 1, 5)
32 second push button (FIG. 4)
33 third push button (FIG. 3)
34 push button actuation surface of 31
35 flange on 31 to 33 (FIGS. 3 to 5)
36 housing thickness at 17 (FIG. 1)
37 thickness of the adjacent region of the housing (FIG. 1)
38 peripheral projection (FIG. 1)
39 inner surface of 11 adjacent to 17 (FIG. 1)
40 open membrane field from 43 to 45 (FIG. 6)
41 flat membrane surface of 21 (FIGS. 1, 7)
42 printed circuit board (FIG. 1)
43 first membrane bulge (FIG. 7)
44 second membrane bulge (FIG. 7)
45 third membrane bulge (FIG. 7)
46 electrical elements of 10 (FIG. 1)
47 base of pot-shaped membrane bulge of 43 (FIGS. 1, 6, and 7)
48 underside of 47 (FIG. 1)
49 upper edge of the frame of 20 (FIG. 1)
50 switching element, microswitch (FIG. 1)

51 actuator of switch 50 (FIG. 1)
52 underside of 31 (FIG. 1)
53 actuation arrow of 31, actuation stroke (FIG. 1)
54 symbols for 34 to 37 (FIGS. 3 to 5)
55 step in 56 for 28 (FIG. 1)
56 web region of 26 for 28 (FIG. 1)

The invention claimed is:

1. An electronic key
with at least one inherently dimensionally stable push button (31 to 33),
which has a peripheral projection (38) that is recessed relative to the push button actuation surface (34),
where the push button (31 to 33) is arranged in an opening (13 to 15) of a housing (11),
the push button (31 to 33), when operated (53), acts on the actuator (51) of a switching element (50) seated in the interior (16) of the housing,
and the peripheral projection (38) of the push button (31 to 35) interacts with an outer stop (18) in the neutral position, which (outer stop 18) limits the upper travel of the push button (31 to 33) in the housing (11, 12), and, when the push button is actuated (53), strikes an inner stop (28), which limits the lower travel of the push button (31 to 33),
and with a membrane (21) that is arranged between the push buttons (31 to 33) and the actuator (51) of the switching element (50) and undergoes elastic deformation when the push button (31 to 33) is operated (52) wherein
the membrane (21) is the soft component of a dual-component element (2K element 20), which is produced by dual-component technology, and
the hard component of the 2K element (20) consists of a frame (22), whose webs 26 enclose at least one open membrane field (40),
where the frame (26) of the 2K element (20) forms the inner stop (28) for the push button (31 to 33),
where the push button (31 to 33) can be freely inserted into the housing opening (13 to 15) from the inside (16) of the housing (11),
where the housing opening (13 to 15) is constructed sufficiently large that it encloses the whole push button actuation surface (34), and
where the inner surface of the peripheral zone (17) of the housing (11), which surrounds the housing opening (13 to 15), forms the outer stop (18) for the push button (31 to 33)

2. An electronic key in accordance with claim 1, wherein the push button (31 to 33) is pushed into its neutral position by spring force (29) provided in the housing interior (16), and that in this neutral position, the recessed projection (28) of the push button (31 to 33) rests on the outer stop (18) of the peripheral zone (17) of the opening of the housing (11).

3. An electronic key in accordance with claim 2, wherein the spring force (29) is produced by the soft component (21) of the 2K element (20) in the exposed membrane field (40), which is located between the webs (26) of the frame (22) of the 2K element (20).

4. An electronic key in accordance with claim 3, wherein the membrane field (40) of the 2K element has pot-shaped bulges (43 to 45) that protrude towards the push buttons (31 to 33),
where, when assembled, the outer surface (47) of the base of each pot-shaped membrane bulge (43 to 45) rests against the under side (52) of the corresponding push button (31 to 33), and when the push button (31 to 33) is operated (53), the membrane bulge (43 to 45) can be compressed in an elastically yielding way, thereby producing at least some of the spring force (29) for restoring the push button (31 to 33).

5. An electronic key in accordance with claim 4, wherein a striker (27) is formed on the underside (48) of the base (47) of the pot-shaped membrane bulge (43 to 45) and transmits the actuation stroke (53) of the push button (31 to 33) to the actuator (51) of the microswitch (50).

6. An electronic key in accordance with claim 2, wherein the spring force (29) for the push button (31) is produced at least partly by the intrinsic restoring force of the actuator (51).

7. An electronic key in accordance with claim 1, wherein the inner stop (28) is formed by a step (55) in the web region (56) of the frame (22) that borders on the exposed membrane field (40) of the 2K element (20
where the step (55), which acts as a stop, is lowered relative to the upper edge (49) of the frame of the 2K element (20).

8. An electronic key in accordance with claim 1, wherein, when assembled, the upper edge (49) of the frame of the 2K element (20) rests on the inner surface (39) of the housing (11).

9. An electronic key in accordance with claim 1, wherein the outer stop (18) on the inner surface of the peripheral zone (17) of the housing opening (13 to 15) consists of an opposing step, which is produced by a reduction of the housing thickness (36) of this peripheral zone (17) relative to adjacent regions (37) of the housing.

10. An electronic key in accordance with claim 1, wherein the push button (31 to 33) has a recessed flange (35) along at least some parts of the periphery of the push button actuation surface (34), which flange (35) acts as a peripheral projection (38) and rests on the outer stop (18) of the housing (11) in the neutral position of the push button.

11. An electronic key in accordance with claim 10, wherein the flange (35) is set back sufficiently far that the push button actuation surface (34) is essentially flush with the adjacent outer surface (19) of the housing (11) when the push button is in its neutral position.

12. An electronic key in accordance with claim 1, wherein the independent push buttons (31 to 33) consist of metallic material (30) or have a metallic coating.

13. An electronic key in accordance with claim 1, wherein the switching element consists of a microswitch (50).

14. An electronic key in accordance with claim 1, wherein the switching element consists of a membrane switch.

15. An electronic key in accordance with claim 1, wherein the switching element consists of a Hall sensor.

16. An electronic key in accordance with claim 1, wherein the switching element consists of a capacitive sensor.

17. An electronic key in accordance with claim 1, wherein the switching element consists of a pressure/force sensor, namely, a so-called piezoelectric element.

18. An electronic key in accordance with claim 1, wherein the switching element consists of a snap-action switch.

19. An electronic key in accordance with claim 1, wherein the switching element consists of a switch mat.

20. An electronic key in accordance with claim 1, wherein the 2K element (20) is mounted on the upper part (11) of the housing by adhesive bonding, friction welding, clips, lasers, and/or ultrasound.

* * * * *